Oct. 21, 1969   J. F. ELBLE   3,473,839
COMBINED PICK-UP TRUCK CAMPER BODY AND HOUSEBOAT
Filed Aug. 31, 1967                                           4 Sheets-Sheet 1
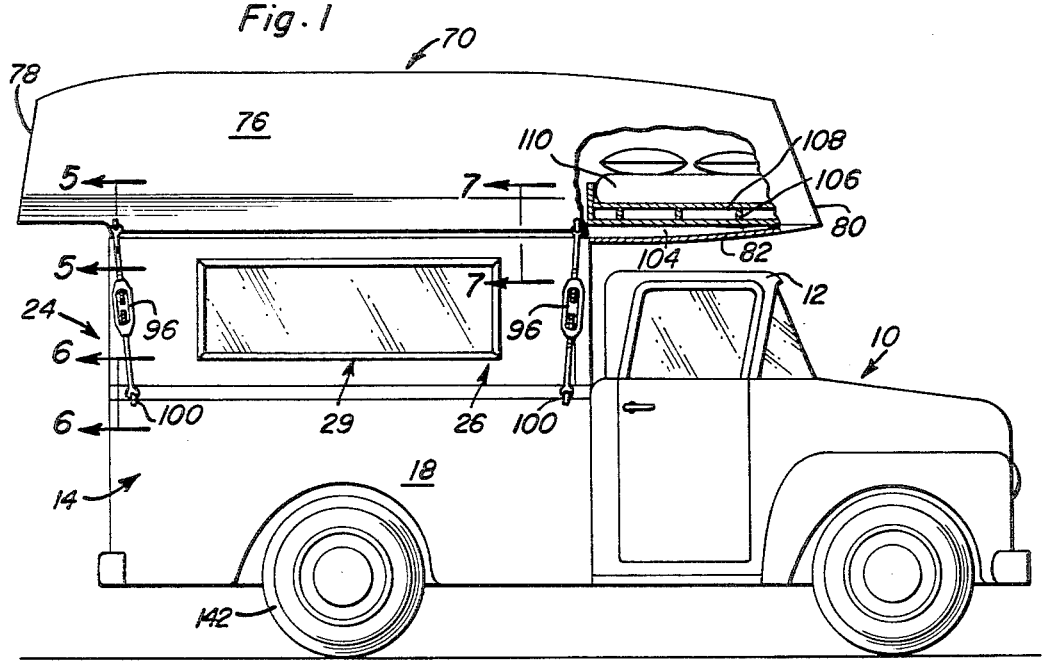
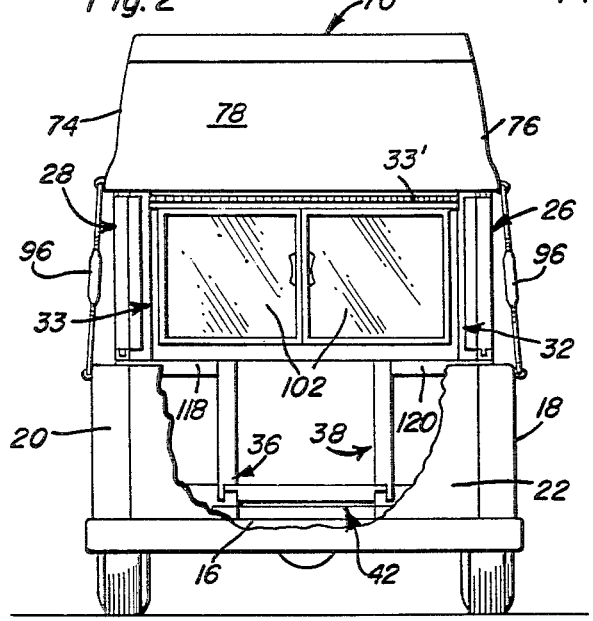
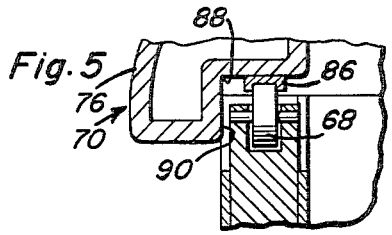
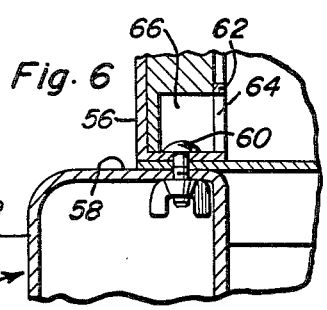
James F. Elble
INVENTOR.
BY Clarence A. O'Brien
and Harvey B. Jackson
Attorneys

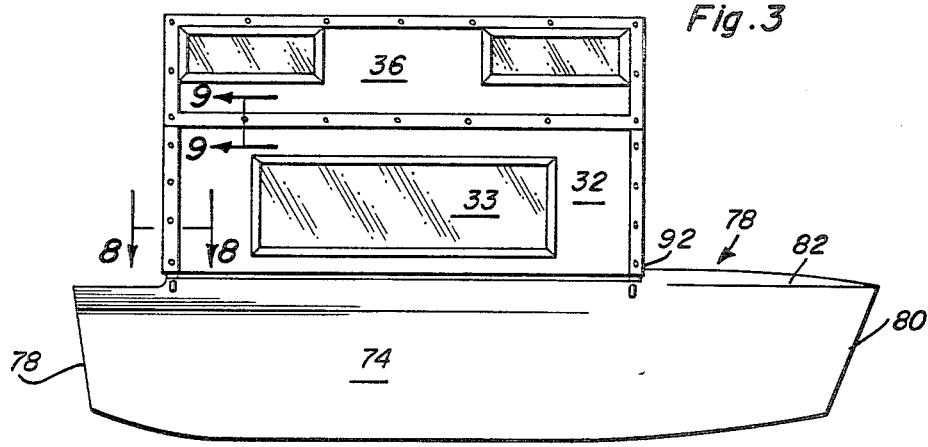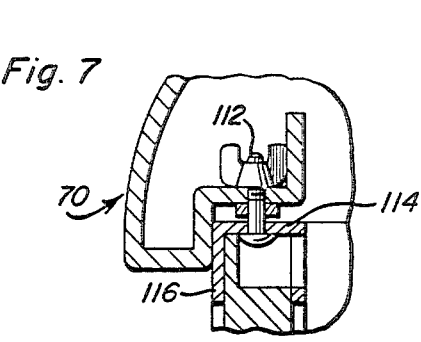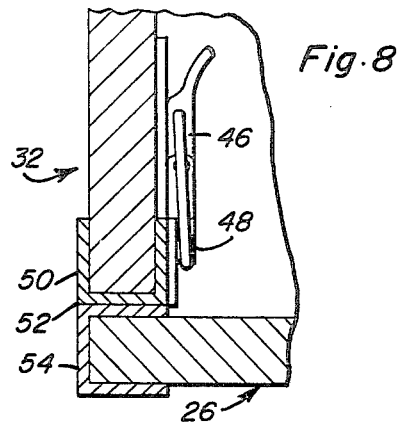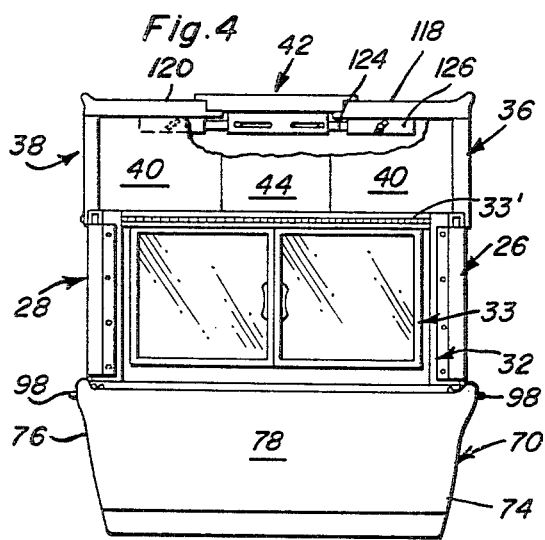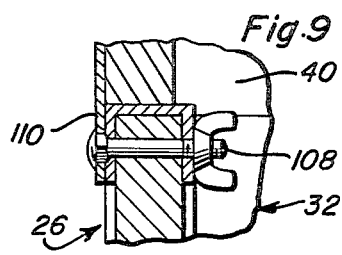
James F. Elble
INVENTOR.

Oct. 21, 1969  J. F. ELBLE  3,473,839
COMBINED PICK-UP TRUCK CAMPER BODY AND HOUSEBOAT
Filed Aug. 31, 1967  4 Sheets-Sheet 3
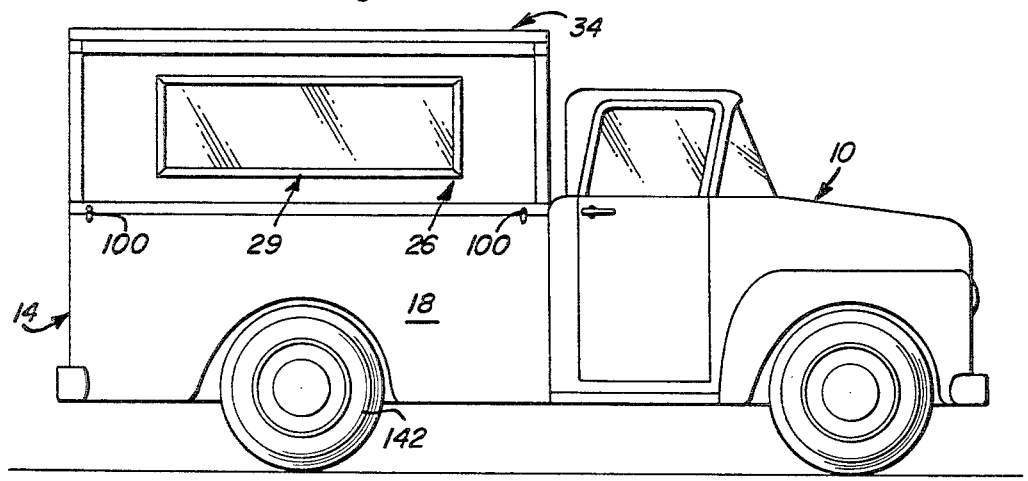
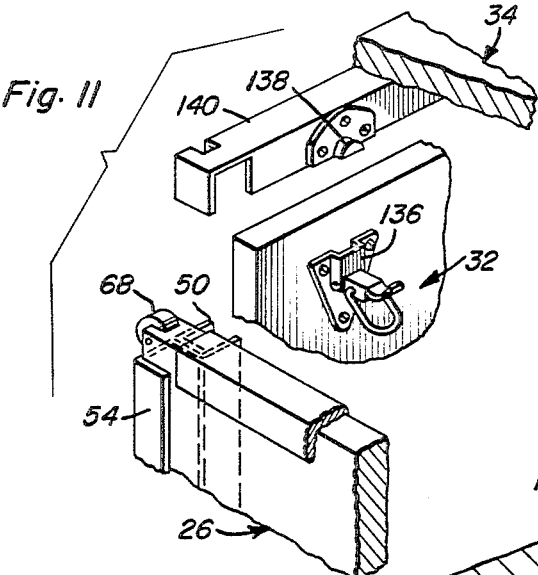
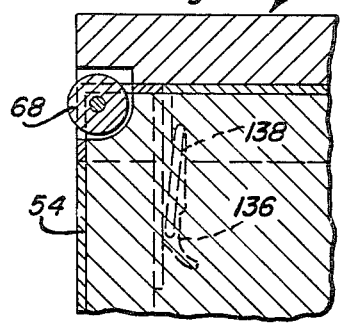
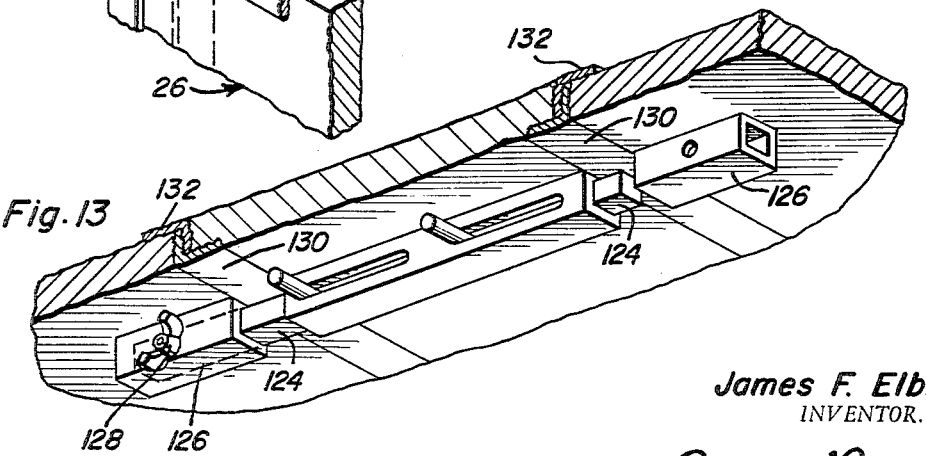
James F. Elble
INVENTOR.

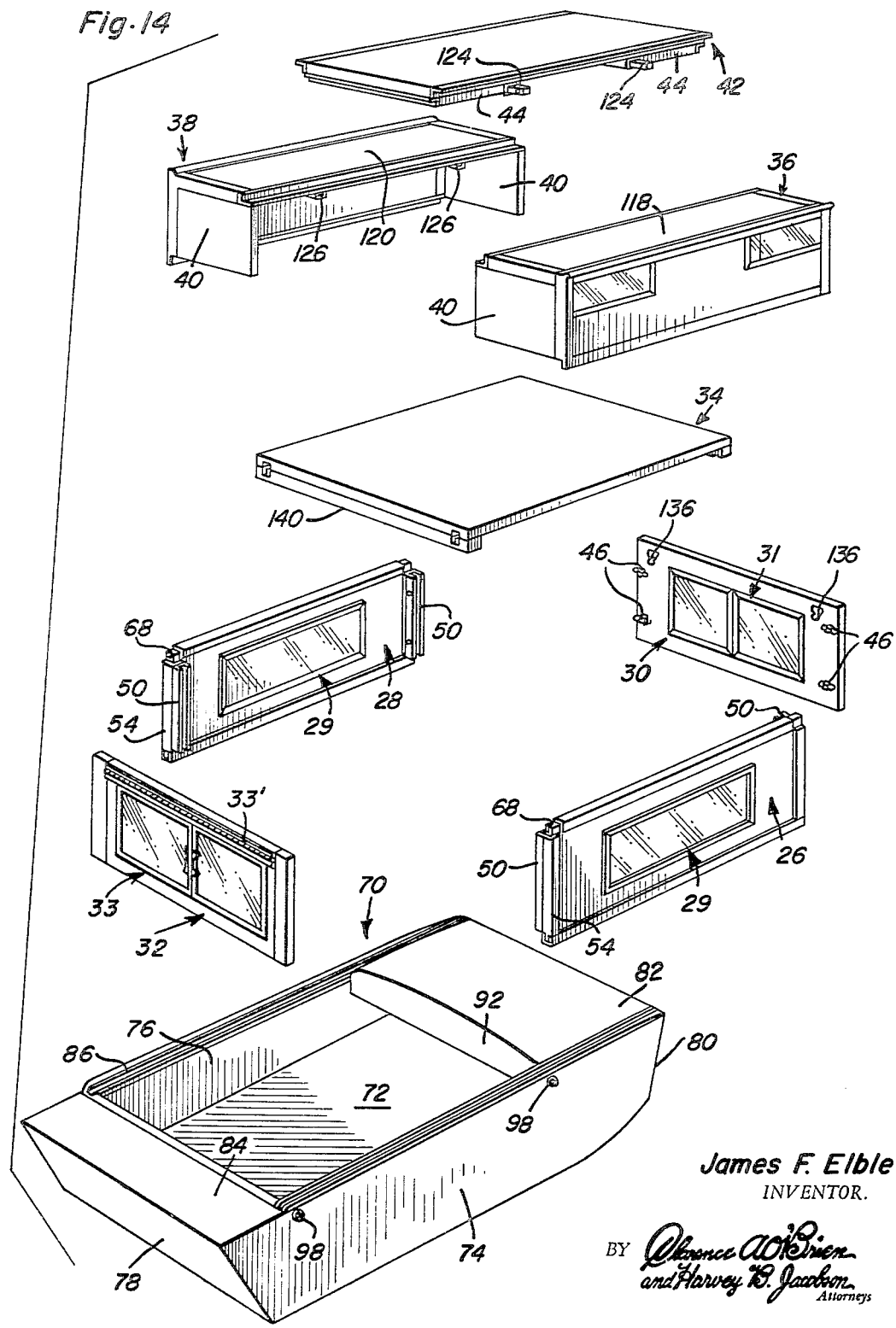

United States Patent Office 3,473,839
Patented Oct. 21, 1969

3,473,839
COMBINED PICK-UP TRUCK CAMPER BODY
AND HOUSEBOAT
James F. Elble, 1330 E. Breckenridge,
Louisville, Ky. 40202
Filed Aug. 31, 1967, Ser. No. 664,718
Int. Cl. B60p 3/32, 3/42
U.S. Cl. 296—23                                13 Claims

ABSTRACT OF THE DISCLOSURE

A structure including a plurality of peripheral upstanding wall portions adapted to be secured to a pick-up truck load bed and to form a camper body for the pick-up truck and including a boat hull which may be secured over the upstanding peripheral wall portions as a roof for the camper body and to which the upstanding peripheral wall portions may be secured as a cabin or enclosure for the boat when the latter is in upright position.

---

The assemblage of the instant invention is provided to provide a means whereby the user of a pick-up truck may have a camper body for the pick-up truck when the truck is being moved over roadways or parked in a stationary position and which includes an inverted boat hull structure as a roof portion for the camper body to which the upstanding wall portions of the body structure may be secured when the boat hull is in upright position so as to provide an enclosure on the boat hull. In this manned, one or more campers may camp in the usual manner when the instant invention is supported from a pick-up truck but with the ability of the instant invention to be readily transformed into a houseboat construction if the campers desire after the associated pick-up truck has been utilized to transport the assemblage of the instant invention to a suitable body of water.

The main object of this invention is to provide an enclosure structure for securement to the load bed of a pick-up truck in a manner to form a camper body for the pick-up truck and which may be subsequently readily converted into a small houseboat.

Another object of this invention, in accordance with the imediately preceding object, is to provide an assembly which may be constructed so as to conform to the load beds of various types of pick-up trucks.

Still another object of this invention is to provide an assemblage which may be utilized to establish an enclosure for persons for travel over the ground as well as travel over a body of water.

A final object of this invention to be specifically enumerated herein is to provide an assemblage in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts thoughout, and in which:

FIGURE 1 is a side elevational view of a conventional form of pick-up truck having the camper body assembly and inverted boat hull of the instant invention supported therefrom;

FIGURE 2 is a rear elevational view of the assemblage illustrated in FIGURE 1 and with portions of the tailgate of the pick-up truck being broken away;

FIGURE 3 is a side elevational view of the boat hull in upright position and with the camper body and body extensions mounted on the boat hull and camper body, respectively;

FIGURE 4 is a rear elevational view of the assemblage illustrated in FIGURE 3;

FIGURE 5 is an enlarged fragmentary vertical sectional view taken substantially upon the plane indicated by the section line 5—5 of FIGURE 1;

FIGURE 6 is an enlarged fragmentary vertical transverse sectional view taken substantially upon the plane indicated by the section line 6—6 of FIGURE 1;

FIGURE 7 is an enlarged fragmentary transverse vertical sectional view taken substantially upon the plane indicated by the section line 7—7 of FIGURE 1;

FIGURE 8 is an enlarged fragmentary horizontal sectional view taken substantially upon the plane indicated by the section line 8—8 of FIGURE 3;

FIGURE 9 is an enlarged fragmentary transverse vertical sectional view taken substantially upon the plane indicated by the section line 9—9 of FIGURE 3;

FIGURE 10 is a further side elevational view of the pick-up truck having the camper body secured thereto and with the inverted boat hull removed and a top wall panel removably secured over the upper marginal edge portions of the camper body in lieu of the inverted boat hull;

FIGURE 11 is an exploded fragmentary perspective view of the upper right hand rear corner of the assemblage illustrated in FIGURE 10;

FIGURE 12 is a fragmentary enlarged longitudinal vertical sectional view taken substantially upon a plane passing through the center of the rear upper right hand corner of the camper body illustrated in FIGURE 10;

FIGURE 13 is a fragmentary perspective view of the three components operable to form an upper extension of the side walls of the camper body; and FIGURE 14 is an exploded perspective view of all of the major components of the instant invention.

Referring now more specifically to FIGURE 1 the numeral 10 generally designates a conventional form of pick-up truck including a forward cab portion 12 and a rear load bed construction generally referred to by the reference numeral 14 including a bottom wall 16, opposite side walls 18 and 20, and a rear tailgate 22 which is swingably supported from the side walls 18 and 20 adjacent its lower marginal edge portion for movement about a horizontal axis extending transversely of the load bed assembly 14 between the lower ends of the side walls 18 and 20.

With attention now invited more specifically to FIGURES 1, 2, 5, 6 and 14, it may be seen that the pick-up truck 10 has a camper body assembly generally referred to by the reference numeral 24 supported therefrom. The camper body assembly 24 includes a pair of opposite side wall assemblies generally referred to by the reference numerals 26 and 28 and a pair of front and rear end wall assemblies generally referred to by the reference numerals 30 and 32, respectively. The camper body assembly 24 also includes a removable top assembly generally referred to by the reference numeral 34 which may be used, in some instances, to close the upper end of the enclosure defined by the wall assemblies 26, 28, 30 and 32. The camper body assembly 24 further includes a pair of similar partial side and top wall extension assemblies 36 and 38 each including a pair of opposite end partial end wall panels 40. Finally, the camper body assembly 24 also includes a partial top wall assembly generally referred to by the reference numeral 42 and which includes retractable pivotally supported end wall sections 44.

With attention now invited to FIGURES 1, 2 and 5–8, it may be seen that the side wall assemblies 26 and 28, which each includes a window assembly generally referred to by the reference numeral 29, are secured at adjacent ends to the corresponding sides of the end wall assemblies 30 and 32 which include window assemblies generally referred to by the reference numerals 31 and 33. The opposite upstanding edge portions of the end wall assemblies 30 and 32 include vertically spaced toggle latch assemblies 46 which are releasably engageable with keepers 48 of conventional design carried by the channel member sections 50 which open laterally outwardly of the opposite ends of the side wall assemblies 26 and 28 and are supported from the latter as at 52 by being secured to the channel members 54 carried by the upstanding edge portions of the side wall assemblies 26 and 28 in any convenient manner. Accordingly, the channel members 50 and 54 are secured together with each channel member 54 embracing a corresponding vertical edge portion of the side wall assembly 26 and the associated channel member 50 snugly embracing the corresponding upstanding edge portion of the adjacent end wall assembly. Therefore, it may be seen that the side and end wall assemblies 26, 28, 30 and 32 may be secured together. As can best be seen from FIGURE 6 of the drawings each of the side wall assemblies 26 includes a channel member 56 secured along its lower marginal edge portion and which may be secured to the top wall portion 58 of the corresponding side wall of the load bed assembly 14 by means of suitable fasteners 60. The inner flange 62 of each channel member 56 is provided with longitudinally spaced openings 64 registered with recesses 66 formed in the corresponding side wall assembly and the fasteners 60 are removably inserted through the openings 64 and have their head portions disposed in the recesses 66.

As can best be seen from FIGURES 11 and 12 of the drawings the rear upper corners of the side wall assemblies 26 and 28 include journalled rollers 68 which project above the upper marginal edge portions of the side wall assemblies 26 and 28 and rearwardly of the rear upstanding edge portions of the side wall assemblies 26 and 28. A boat hull generally referred to by the reference numeral 70 and including a bottom 72, opposite sides 74 and 76, a transom 78 and a bow portion 80 including a decking portion 82 extending between the forward end portions of the sides or side walls 74 and 76 is provided. The boat hull 70 further includes a rear decking portion 84 extending between the rear ends of the opposite sides 74 and 76 and the sides 74 and 76 have a pair of shallow channel members 86 secured thereto which extend from the rear decking portion 84 forwardly to the forwardmost extremities of the bow portion 80. As can best be seen from FIGURE 5 of the drawings the shallow channel members 86 are secured in relieved areas 88 of the upper edge portions of the sides 74 and 76 defining upstanding shoulders 90 of the sides 74 and 76 which oppose each other. Further, the forward decking portion 82, at its rearmost edge portion 92, projects above the sides 74 and 76.

The boat hull 70 is positionable over the upper edge portions of the side and end wall assemblies 26, 28, 30 and 32 in the manner illustrated in FIGURE 1 of the drawings. In order to mount the boat hull 70 over the camper body assembly 24, the boat hull 70 is first inverted with its bow end portion inclined upwardly so that the forwardmost ends of the shallow channel members 86 are engaged with the rollers 68 then, the rear end portion of the inverted boat hull 70 may be raised and pushed forwardly so as to slide the inverted boat hull 70 forwardly over the camper body assembly 24. As soon as the rear edge portion 92 has dropped forwardly of the front surface of the end wall assembly 30, suitable turnbuckles 96 may be secured between the longitudinally spaced eyes 98 carried by each side of the boat hull 70 and the longitudinally spaced eyes 100 carried by each side wall of the load bed assembly 14.

The camper body assembly 24 may have access gained thereto through the tailgate 22. The latter may be pivoted rearwardly and downwardly at its upper end in order to be pivoted to the open position and persons desiring entry into the load bed assembly 24 may pass over the tailgate 22 and beneath the rear wall assembly 32. However, the window assembly 33 of the rear wall assembly 32 is hingedly secured to the latter by means of a hinge assembly 33' and therefore the window assembly 33 may be pivoted toward a generally horizontally disposed open position in order that an opening into the rear end of the camper body assembly 24 will be provided which is of a height extending from the tailgate 22 when the latter is in a horizontal position to the undersurface of the window assembly 33 when the latter is in a horizontal open position. Also, the window assemblies 31 and 33 include double sliding window sections 102.

With attention now directed more specifically to FIGURE 1 of the drawings it may be seen that the front decking portion 82 is reinforced by means of longitudinal stringers 104 secured therebeneath and also transverse braces 106 secured across the undersurfaces of the stringers 104. Beneath the transverse braces 106 there is secured a panel 108 which, when the boat hull 70 is inverted, serves as a support for a double mattress 110 upon which persons using the camper body assembly 24 may sleep. Therefore, the entire bow portion of the boat hull 70 comprises a forwardly projecting cantilever supported upper section of the camper body assembly.

If it is desired, the boat hull 70 may be removed, especially if the camper body assembly 24 is being utilized adjacent a body of water upon which the boat hull 70 is to be used, and the partial side and top wall extensions 36 and 38 may be secured to the upper edge portions of the side wall assemblies 26 and 28; suitable fasteners 108 are secured through depending flange portions 110 of the extensions 36 and 38 and also through the upper marginal edge portions of the side wall assemblies 26 and 28 in order to secure the extensions 36 and 38 to the upper edge portions of the side wall assemblies 26 and 28 in lieu of the boat hull 70. The boat hull 70, on the other hand, is secured over the camper body assembly 24 by means of suitable fasteners 112 secured through the recessed area 88, the channel members 86 and the bight portion 114 of the channel member 116 secured to the upper marginal edge portion of the corresponding side wall assembly. Of course, the fasteners 112 are utilized in combination with the turnbuckles 96 to secure the boat hull 70 over the upper end of the camper body assembly 24.

With the extensions 36 and 38 secured to the upper marginal edge portions of the side wall assemblies 26 and 28, the partial top wall assembly 42 is dropped between the adjacent edge portions of the upper panels 118 in the manner illustrated in FIGURE 13 of the drawings and the slide bolts 124 reciprocably supported from the partial top wall assembly 42 are shifted toward their extended positions disposed within the tubular members 126 carried by the upper panels 118 and 120 and are secured in position by means of fasteners 128.

The upper panels 118 and 120 are provided with L-shaped support members 130 extending along their adjacent edge portions and the opposite edge portions of the partial top wall assembly 42 includes similar L-shaped support members 132. The vertical leg portions of the L-shaped support members 132 are snugly received between the vertical leg portions of the L-shaped support members 130 and the horizontal leg portions of the support members 132 abut the adjacent upper surfaces of the panels 118 and 120 while the undersurface portions of the partial top wall assembly extending along opposite side portions thereof abut the upper surfaces of the horizontal flange portions of the L-shaped members 130. As can best be seen from FIGURES 4 and 14 of the drawings, prior to the partial top wall assembly 42 being disposed between the adjacent edge portions of the upper panels 118 and 120, the end wall sections 44 are pivoted downward so as to extend between the adjacent edge portions of corresponding end wall panels 40. Accordingly, when the partial top wall assembly 42 is displaced downwardly between the upper panels 118 and 120, the partial side and top wall extensions 36 and 38 together with the partial top wall assembly 42 form a complete closure for the upper end of the area enclosed by the side wall assemblies 26 and 28 and the end wall assemblies 30 and 32. On the other hand, if the added vertical height which is provided by the extensions 36 and 38 and the partial top wall assembly 42 is not desired, the removable top wall assembly 34 may be secured over the upper edge portions of the side wall assemblies 26 and 28 and the end wall assemblies 30 and 32 by means of toggle latches 136 carried by the upper marginal edge portions of the end wall assemblies 30 and 32 and coacting latch portions 138 carried by the depending channel members 140 dependingly supported from the opposite end edge portions of the removable top wall assembly 34. However, when the removable top wall assembly 34 is utilized in lieu of the extensions 36 and 38 and the partial top wall assembly 42, the latter is disposed inside the camper body assembly 24 on the bottom wall 16 in the manner illustrated in FIGURE 2 of the drawings and the extensions 36 and 38 are also disposed within the load bed assembly 14 in reversed positions with the extensions 36 and 38 opening toward the inwardly projecting wheel wells for the rear wheels 142 of the pick-up truck 10 and the upper panels 118 and 120 defining surfaces upon which single mattresses may be disposed for sleeping purposes.

With attention now invited more specifically to FIGURES 3 and 4 of the drawings, it may be seen that the camper body assembly 24, with the extensions 36 and 38 secured thereto as well as the partial top wall assembly 42, may be removed from supporting engagement with the top walls 58 of the side walls 18 and 20 of the load bed assembly 14 and supported from the upper edge portions of the opposite sides 74 and 76 of the boat hull 10. In this manner, the boat hull 70 may be transformed into a houseboat completely enclosed and into which access may be gained through the rear window assembly 33. When the camper body assembly 24 is secured to the upper marginal portions of the sides 74 and 76 of the boat hull 70, fasteners such as fasteners 112 illustrated in FIGURE 7 of the drawings are utilized but are secured through the channel members 56 carried by the lower edge portions of the side wall assemblies 26 and 28 in the manner in which the fasteners 60 are secured through the channel members 56 as shown in FIGURE 6 of the drawings.

The vehicle body from which the camper body is supported need not be the load bed portion of a pickup truck. Instead, the sidewalls of a camping trailer and the extension wall portions of a camping station wagon of the type including an extension projecting above the roof of the station wagon may be used to support either the boat hull 70 in inverted position or the wall portions of the assembly 24 with the latter having either the inverted boat hull 70 or the extension assemblies 36 and 38 disposed thereabove.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a plurality of upstanding rigid walls interconnected at adjacent edge portions and forming an open top enclosure about an area disposed therein, the lower marginal edge portions of said walls being adapted to be supported from the upper marginal edge portions of upstanding sidewalls carried by a vehicle, and an upwardly opening boat hull including a bottom and sides removably positionable over the upper marginal edge portions of said walls in inverted position to form an upper extension for and to close the upper end of said area enclosed by said walls.

2. The combination of claim 1 wherein said lower marginal edge portions of said walls are, alternately, removably securable to the upper peripheral edge portions of said boat hull when the latter is in upright position so as to form an enclosed open top area above a predetermined area of the interior of said boat hull.

3. The combination of claim 1 including a vehicle having upstanding opposite sidewalls to which at least some of said lower marginal edge portions are removably secured.

4. The combination of claim 3 wherein said lower marginal edge portions of said walls are, alternately, removably securable to the opposite sides of said boat hull when the latter is in upright position so as to form an enclosed open top area above a predetermined area of the interior of said boat hull.

5. The combination of claim 1 wherein said boat hull includes at least one end portion including a reinforced decking extending between the opposite sides of said hull, said decking, when said hull is inverted and secured to said upper marginal edge portions, projecting outwardly from the upper marginal edge portion of one of said walls and adapted to have bedding placed over the surface thereof facing the bottom of said hull.

6. The combination of claim 5 including a pick-up truck provided with a load bed including opposite side walls to which at least some of said lower marginal edge portions are removably secured, said pick-up truck including a forward cab portion behind which said load bed is disposed and which projects upwardly above said load bed, said decking extending over at least the rear portion of said cab portion.

7. The combination of claim 1 including a top wall assembly alternately removably positionable over said upstanding walls in lieu of said inverted boat hull, said lower marginal edge portions of said upstanding walls being removably securable to the opposite sides of said boat hull when the latter is in upright position so as to form an enclosed open top area above a predetermined area of the interior of said boat hull.

8. In combination with a vehicle provided with upstanding opposite sidewalls, a plurality of upstanding walls interconnected at adjacent edge portions to form an enclosure about an area disposed therein, the lower marginal edge portions of said upstanding walls being supported from the upper marginal edge portions of said sidewalls, an extension assembly for said upstanding walls removably supportable from the upper edge portions of said walls and operable to form an upward extension of and form a cover over said area, and a generally planar top wall assembly removably supportable from the upper edge portions of said walls in lieu of said extension assembly, said extension assembly being of the knock-down type and receivable within said load bed below said upstanding sides, said upstanding sides defining therebetween a load bed including inwardly displaced opposite side portions intermediate its opposite ends defining downwardly and outwardly opening opposite side wheel wells, said extension assembly including a pair of sections each including adjoining side and top wall panels disposed at generally right angles relative to each other, said sections being receivable in opposite side portions of said load bed in positions extending longitudinally of the latter adjacent said sidewalls and opening downwardly and outwardly toward the adjacent sidewalls so as to receive said inwardly displaced portions therein and define elevated shelves along opposite sidewalls of said load bed adapted to have bedding disposed thereon.

9. The combination of claim 1 wherein said upstanding walls include a pair of opposite side walls whose rear upper corner portions include rollers journalled for rotation about horizontal transverse axes, said boat hull including upwardly facing surface means extending along the upper marginal edge portions of the sides thereof engageable with said rollers when said hull is inverted and adapted to be supported from and guided by said rollers during longitudinal shifting of said hull, when inverted, relative to said upstanding side walls.

10. The combination of claim 9 wherein said boat hull includes at least one end portion including a reinforced decking extending between the opposite sides of said hull, said decking, when said hull is inverted and secured to said upper marginal edge portions, projecting outwardly from the upper marginal edge portion of one of said walls and adapted to have bedding placed over the surface thereof facing the bottom of said hull.

11. The combination of claim 10 including a pick-up truck provided with a load bed including opposite side walls to which at least some of said lower marginal edge portions are removably secured, said pick-up truck including a forward cab portion behind which said load bed is disposed and which projects upwardly above said load bed, said decking extending over at least the rear portion of said cab portion.

12. The combination of claim 1 including a pickup truck provided with a load bed including opposite sidewalls to which at least some of said lower marginal edge portions are removably secured.

13. The combination of claim 12 including a top wall assembly alternately removably positionable over said upstanding walls in lieu of said inverted boat hull, said lower marginal edge portions of said upstanding walls being removably securable to the opposite sides of said boat hull when the latter is in upright position so as to form an enclosed area above a predetermined area of the interior of said boat hull.

References Cited

UNITED STATES PATENTS

| 1,476,051 | 12/1923 | Cassell | 296—23 |
| 2,591,380 | 4/1952 | Schreiner | 296—27 X |

FOREIGN PATENTS 1,481,097  4/1967  France.

PHILIP GOODMAN, Primary Examiner

U.S. Cl. X.R.

9—1